US008516467B2

(12) United States Patent
Guy et al.

(10) Patent No.: US 8,516,467 B2
(45) Date of Patent: Aug. 20, 2013

(54) METHOD AND APPARATUS FOR ENHANCING COMPREHENSION OF CODE TIME COMPLEXITY AND FLOW

(75) Inventors: Nathaniel Guy, Seattle, WA (US); Chad Hinkle, Redmond, WA (US); Mark Jawad, Redmond, WA (US); Steve Rabin, Bothell, WA (US)

(73) Assignee: Nintendo Co., Ltd., Kyoto (JP)

( * ) Notice: Subject to any disclaimer, the term of this patent is extended or adjusted under 35 U.S.C. 154(b) by 353 days.

(21) Appl. No.: 12/872,200

(22) Filed: Aug. 31, 2010

(65) Prior Publication Data

US 2011/0191760 A1      Aug. 4, 2011

Related U.S. Application Data

(60) Provisional application No. 61/299,477, filed on Jan. 29, 2010.

(51) Int. Cl.
*G06F 9/45*          (2006.01)

(52) U.S. Cl.
USPC ........... 717/155; 717/117; 717/146; 717/131; 702/176; 710/22; 709/224

(58) Field of Classification Search
USPC ................ 717/155, 117, 146, 131; 702/176; 710/22
See application file for complete search history.

(56) References Cited

U.S. PATENT DOCUMENTS

| 4,315,315 | A * | 2/1982 | Kossiakoff | 717/109 |
|---|---|---|---|---|
| 6,735,764 | B2 * | 5/2004 | Nakai | 717/156 |
| 7,949,422 | B1 * | 5/2011 | Little et al. | 700/180 |
| 8,190,807 | B2 * | 5/2012 | Reid et al. | 711/3 |
| 2004/0230773 | A1 * | 11/2004 | Busaba et al. | 712/215 |
| 2005/0183058 | A1 | 8/2005 | Meijer et al. | |
| 2006/0048115 | A1 | 3/2006 | Tal et al. | |
| 2007/0044075 | A1 | 2/2007 | Koning et al. | |
| 2008/0114937 | A1 * | 5/2008 | Reid et al. | 711/117 |
| 2008/0320457 | A1 * | 12/2008 | King et al. | 717/146 |
| 2009/0094585 | A1 | 4/2009 | Choi et al. | |
| 2009/0144698 | A1 | 6/2009 | Fanning et al. | |

OTHER PUBLICATIONS

International Search Report mailed Sep. 28, 2011 in International Application No. PCT/US2011/022844 (3 pages).
Written Opinion mailed Sep. 28, 2011 in International Application No. PCT/US2011/022844 (4 pages).
"Big O Notation," Wikipedia, The Free Encyclopedia, http://en.wikipedia.org/wiki/Big_O_notation, Downloaded Nov. 11, 2010, 15 pages.

* cited by examiner

*Primary Examiner* — Vanel Frenel
(74) *Attorney, Agent, or Firm* — Nixon & Vanderhye P.C.

(57) ABSTRACT

A method and apparatus that utilizes techniques for formatting assembly and/or machine code, including using arrows, indentations and textual symbols, so that a programmer who reads the code has an enhanced understanding of the program flow. Different methods of assessing computing time complexity (e.g., the up branch method and the strongly connected subgraph method) have strengths and weaknesses but benefit from being used together.

25 Claims, 13 Drawing Sheets

| | Machine/Assembler Code | | | Branches Annotated with Arrows | |
|---|---|---|---|---|---|
| 0: | 0000109C: | 39400000 | li | r10,0 | |
| 1: | 000010A0: | 39200000 | li | r9,0 | |
| 2: | 000010A4: | 48000068 | b | *+104 | |
| 3: | 000010A8: | 39000000 | li | r8,0 | |
| 4: | 000010AC: | 48000054 | b | *+84 | |
| 5: | 000010B0: | 1C0A0014 | mulli | r0,r10,20 | |
| 6: | 000010B4: | C0000000 | lfs | fp0,@7540@sda21 | |
| 7: | 000010B8: | 7C07052E | stfsx | fp0,r7,r0 | |
| 8: | 000010BC: | 7C670214 | add | r3,r7,r0 | |
| 9: | 000010C0: | D0030004 | stfs | fp0,4(r3) | |
| 10: | 000010C4: | 2C060000 | cmpwi | r6,0x0000 | |
| 11: | 000010C8: | 41820010 | beq | *+16 | |
| 12: | 000010CC: | C0000000 | lfs | fp0,@7743@sda21 | |
| 13: | 000010D0: | D0030008 | stfs | fp0,8(r3) | |
| 14: | 000010D4: | 4800000C | b | *+12 | |
| 15: | 000010D8: | C0000000 | lfs | fp0,@7542@sda21 | |
| 16: | 000010DC: | D0030008 | stfs | fp0,8(r3) | |
| 17: | 000010E0: | 1C0A0014 | mulli | r0,r10,20 | |
| 18: | 000010E4: | C0000000 | lfs | fp0,@7540@sda21 | |
| 19: | 000010E8: | 7C670214 | add | r3,r7,r0 | |
| 20: | 000010EC: | D003000C | stfs | fp0,12(r3) | |
| 21: | 000010F0: | 38000001 | li | r0,1 | |
| 22: | 000010F4: | 90030010 | stw | r0,16(r3) | |
| 23: | 000010F8: | 394A0001 | addi | r10,r10,1 | |
| 24: | 000010FC: | 39080001 | addi | r8,r8,1 | |
| 25: | 00001100: | 7C082040 | cmplw | r8,r4 | |
| 26: | 00001104: | 4180FFAC | blt | *-84 | |
| 27: | 00001108: | 39290001 | addi | r9,r9,1 | |
| 28: | 0000110C: | 7C092840 | cmplw | r9,r5 | |
| 29: | 00001110: | 4180FF98 | blt | *-104 | |
| 30: | 00001114: | 4E800020 | blr | | |

Figure 4

Example Indenting Algorithm

Example Upbranch Method

Example Recursive Method
To Determine Branch Time Complexity

Example Strongly connected
Subgraph Method

METHOD AND APPARATUS FOR ENHANCING COMPREHENSION OF CODE TIME COMPLEXITY AND FLOW

CROSS-REFERENCE TO RELATED APPLICATIONS

This application claims priority to U.S. Application 61/299,477, filed Jan. 29, 2010, the entire contents of which is incorporated herein by reference.

TECHNICAL FIELD

The technology herein relates to a method and apparatus for automatically analyzing general time complexity in code, and for formatting computer assembly and/or machine code to enhance comprehension of underlying flow by a user who reads the code. In more detail, the technology herein relates to techniques using visual means for formatting and graphically presenting assembly and/or machine code, including using arrows, indentations, and textual symbols, so that a programmer who reads the code has an enhanced understanding of program flow and thus how the program works.

BACKGROUND AND SUMMARY

When digital computers were first invented, programmers wrote programs in binary numbers (1's and 0's) or hexadecimal numbers (0-F) the computer CPU could directly execute. Throughout the 1960's and beyond, many computer front panels included banks of switches a programmer could use to directly program binary instructions into the computer. However, writing code in binary was challenging and prone to errors. Therefore, beginning in the 1950's, programmers began writing in so-called "assembly language." Assembly language provided one-to-one correspondence between binary machine code instructions and human-written assembly language instructions, but substituted mnemonics (easy to remember short symbol strings) for the machine language operational codes (op codes) and used symbols instead of machine addresses. Writing in assembly language still required the programmer to have an intimate understanding of the hardware she was writing the program for, but simplified the programmer's tasks and eliminated sources of error.

Because assembly code is so intimately intertwined with hardware functionality, it was possible for a good assembly language programmer to optimize execution efficiency, reliability, speed and program size. This was especially important if the programmer wanted to squeeze every last ounce of performance out of a resource-constrained computing platform.

More than a half-century later, modern day computers have comparatively vast resources in terms of processor speed, memory storage and other performance characteristics. Furthermore, there are now vast numbers of computing platforms with a wide variety of different processor types and instruction sets. Therefore, most modern day computer programs are mostly written in higher level languages such as Java, C++ or the like. Such higher level languages have many advantages including portability across multiple computing platforms and insulating the human programmer from the detailed operation of particular computing devices. Typical computing platforms cannot execute the higher level languages directly. Rather, the higher level instructions are first compiled or interpreted to produce lower level "machine code" that the particular processor executing the instructions can execute. There is an entire industry devoted to developing compilers, linkers, and other tools to provide optimal transformation from higher level languages to machine code on various platforms.

Generally speaking, it would be impractical or impossible to provide the rich, cross-platform software functionality we take for granted today if programmers were still writing all code in assembler. In fact, it is relatively rare to find a modern day programmer who is proficient in assembly. However, there are certain instances when assembly language or machine code instructions retain their importance.

For example, there are some game programming situations where extreme optimization is required. As one example, an inner loop of a processor-intensive algorithm within a game program that may be executed repeatedly hundreds or thousands of times each second may need to be maximally optimized. Some argue that a modern-day optimizing compiler can do a better job of optimizing than can any human programmer, but others disagree and believe there is no substitute for a human being who fully understands the target hardware and can apply creativity to minimize the number of instructions needed to perform a given function.

Additionally, sometimes legacy game code originally written in assembly now has to be understood and/or modified. Another interesting situation arises where a programmer does not have access to the source code for a particular game, but needs to understand how a particular part of the game code executes. It is possible to disassemble the machine code to provide mnemonic-oriented assembly language, but such code can be difficult to understand—especially by programmers who are used to writing in higher level languages.

Normally, programmers do not deal directly with machine code. However, sometimes there is a need to code these instructions by hand, or inspect compiler-generated machine code.

Thus, in these instances, it would be beneficial if the machine code could be visualized in a manner that more easily facilitates human comprehension. The technology provided herein is directed to specific techniques that work together to enhance and transform machine code, allowing a human to more easily understand the flow of control in a function or a program.

When reading any code, the flow of the program is very important to overall comprehension. Normally, the flow is from one machine instruction to the next. However, conditional or unconditional branches complicate the flow, causing execution to conditionally or unconditionally skip to an arbitrary instruction. Sometimes the flow can branch to previously executed instructions, providing what is known as a "loop," where a sequence of instructions may be executed an arbitrary number of times.

In mathematics, computer science, and related fields, big O notation (also known as Big Oh notation, Landau notation, Bachmann-Landau notation, and asymptotic notation) describes the limiting behavior of a function when the argument tends towards a particular value or infinity, usually in terms of simpler functions. Big O notation allows its users to simplify functions in order to concentrate on their growth rates: different functions with the same growth rate may be represented using the same O notation. Although developed as a part of pure mathematics, this notation is now frequently also used in the analysis of algorithms to describe an algorithm's usage of computational resources: the worst case or average case running time or memory usage of an algorithm is often expressed as a function of the length of its input using big O notation. This allows algorithm designers to predict the behavior of their algorithms and to determine which of multiple algorithms to use, in a way that is independent of computer architecture or clock rate. Because Big O notation discards multiplicative constants on the running time, and ignores efficiency for low input sizes, it does not always reveal the fastest algorithm in practice or for practically-sized data sets. But the approach is still very effective for comparing the scalability of various algorithms as input sizes become large. A description of a function in terms of big O notation usually only provides an upper bound on the growth rate of the function. Associated with big O notation are several related notations, using the symbols o, Ω, ω, and Θ, to describe other kinds of bounds on asymptotic growth rates. Big O notation is also used in many other fields to provide similar estimates. See Wikipedia "Big O Notation."

There are alternative techniques for analyzing program flow and complexity. One exemplary illustrative non-limiting technique is based on "indentation level" signifying branching. Generally speaking, branching or looping in a computer program is often indicated by indenting code portions that are within the branch or loop. Hence, four levels of looping can be indicated by four-level indentation. An exemplary illustrative non-limiting implementation takes advantage of such typographic presentation to analyze program complexity based on indentation level. Transitions from one indentation level to another can indicate a change in complexity. The more indentation levels, generally speaking, the more complex the program structure. Automatic program analysis based on indentation level can thus be one useful measure of program complexity.

In one exemplary illustrative non-limiting implementation, branching arrows either facing forward/downward or backward/upward are automatically generated and used to visually indicate the flow of the program executed by the machine code. When presented in this manner, the branching destination of each machine code instruction is emphasized, so that the human reader, for example, a programmer, can grasp the flow of the program more easily and quickly.

In another exemplary illustrative non-limiting implementation, indentation of various machine code instruction lines is automatically generated and used to visually indicate the natural division of the machine code into blocks due to branching from a specific machine code instruction to other instructions. In some implementations, the destination of a branching command is visually noted in the machine code branching instruction, and the indentation continues until a machine code instruction with a visual mark is encountered.

In yet another exemplary illustrative non-limiting implementation, the flow and the complexity of the machine code are automatically analyzed and visually noted by computing the time complexity associated with each machine code block, or each machine code instruction, and marking the various components of the machine code accordingly.

An alternative way to analyze program complexity can be referred to as the "strongly connected subgraph method," and can be used to detect worst case general time complexity of program assembly instructions. In one exemplary illustrative non-limiting implementation, time complexity may be different from program structural complexity. Such a technique can be based on the code flow and destination of branch instructions and may detect time complexity in terms of nesting level. Such techniques, for example, create a code flow graph, identify strongly connected subgraphs, create collections of strongly connected subgraphs, create a collection graph, analyze for longest path in a collection graph, sort collections and assign time complexity for interpretation, display, etc.

The strongly connected subgraph method looks into the dynamic flow of the program by exhaustively looking into the sequence of line to line instructions and identifying cyclic transitions (representing strongly connected subgraphs). This detection of nesting levels allows for the detection of actual usage of the program by the various portions thereof.

The indentation level or "up branch method" of computing time complexity and the strongly connected subgraph method of computing time complexity have respective strengths and weaknesses as well as differences between them. For example, the up branch method may sometimes incorrectly attribute a higher time complexity to a line of code due to the grouping nature of the algorithm with respect to line numbering, when in fact the line may not be a true part of the cycle. The up branch method is conservative, not recognizing cycle containment when the first or last lines of code are shared between cycles, and not recognizing cycle containment when a cycle partially overlaps another cycle with regard to line numbering. On the other hand, the strongly connected subgraph method tends to aggressively recognize cycle containment when in fact the source code or assembly code might not result in this time complexity e.g., since the actual computation of each line of code that causes a branch to be taken is not analyzed. The strongly connected subgraph method may not ever incorrectly attribute a lower time complexity to a line of code as theoretically possible thus every computed time complexity is a maximum.

Given the strength and weaknesses of the up branch method time complexity algorithm and the strongly connected subgraphs method time complexity algorithm, combination strategies can be employed. For example, the strongly connected subgraph method may be used to determine the worst case time complexity that is theoretically possible (e.g., based on naive code flow and branching flow). Then, it is possible to take the minimum time complexity for each line of code between the up branch and the strongly connected subgraph method to provide a conservative estimate of time complexity while eliminating incorrect higher time complexities present in the up branch method.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 4 schematically shows a non-limiting exemplary embodiment of a representation of a machine code block having branch destination arrows;

DETAILED DESCRIPTION

Techniques described herein can be performed on any type of computer or gaming system including a computer platform, a personal computer, a networked server, a stationary or portable video game machine, or any other type of device or arrangement having computation capabilities. One exemplary illustrative non-limiting implementation is described below, but other implementations are possible.

Figure 1:
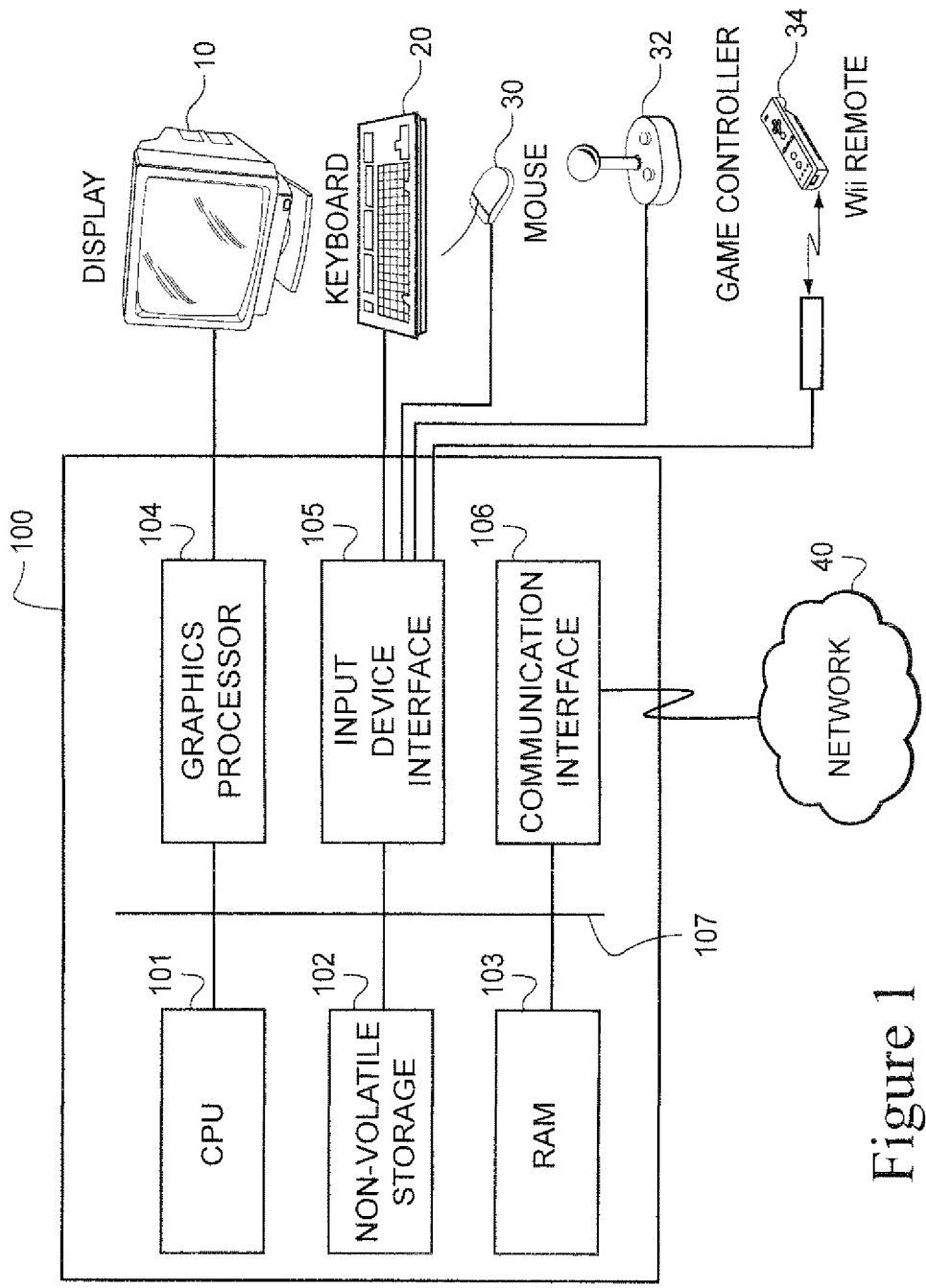
FIG. 1 schematically shows the internal structure of an exemplary non-limiting computer system.

FIG. 1 shows a non-limiting example of a hardware platform on which the exemplary embodiment presented herein is implemented. The platform 100 includes: a central processing unit (CPU) 101, non-volatile storage such as a hard disk drive (HDD) 102 or flash memory device, a random access memory (RAM) 103, a graphics processor 104, an input device interface 105, and a communication interface 106. The CPU 101 controls the platform, interacting with other elements via a common bus 107. The RAM 103 temporarily stores at least a part of the operating system programs and application programs the CPU 101 executes. The storage 102 stores the operating system (OS) (if any) and application programs as well as software tools. Even though one computer platform is shown in FIG. 1, other computers may be connected to a network 40, each computer having the exemplary embodiment presented herein.

The graphics processor 104 produces video images in accordance to commands from the CPU 101 and displays them on the screen 10. The input device interface 105 receives signals form an external input device, e.g., a keyboard 20, a mouse 30, game controllers 32, 34, etc. These input signals are supplied to the CPU 101 via the bus 107. The communication interface 106 allows the CPU 101 to exchange data with other computers on the network 40.

Figure 2:
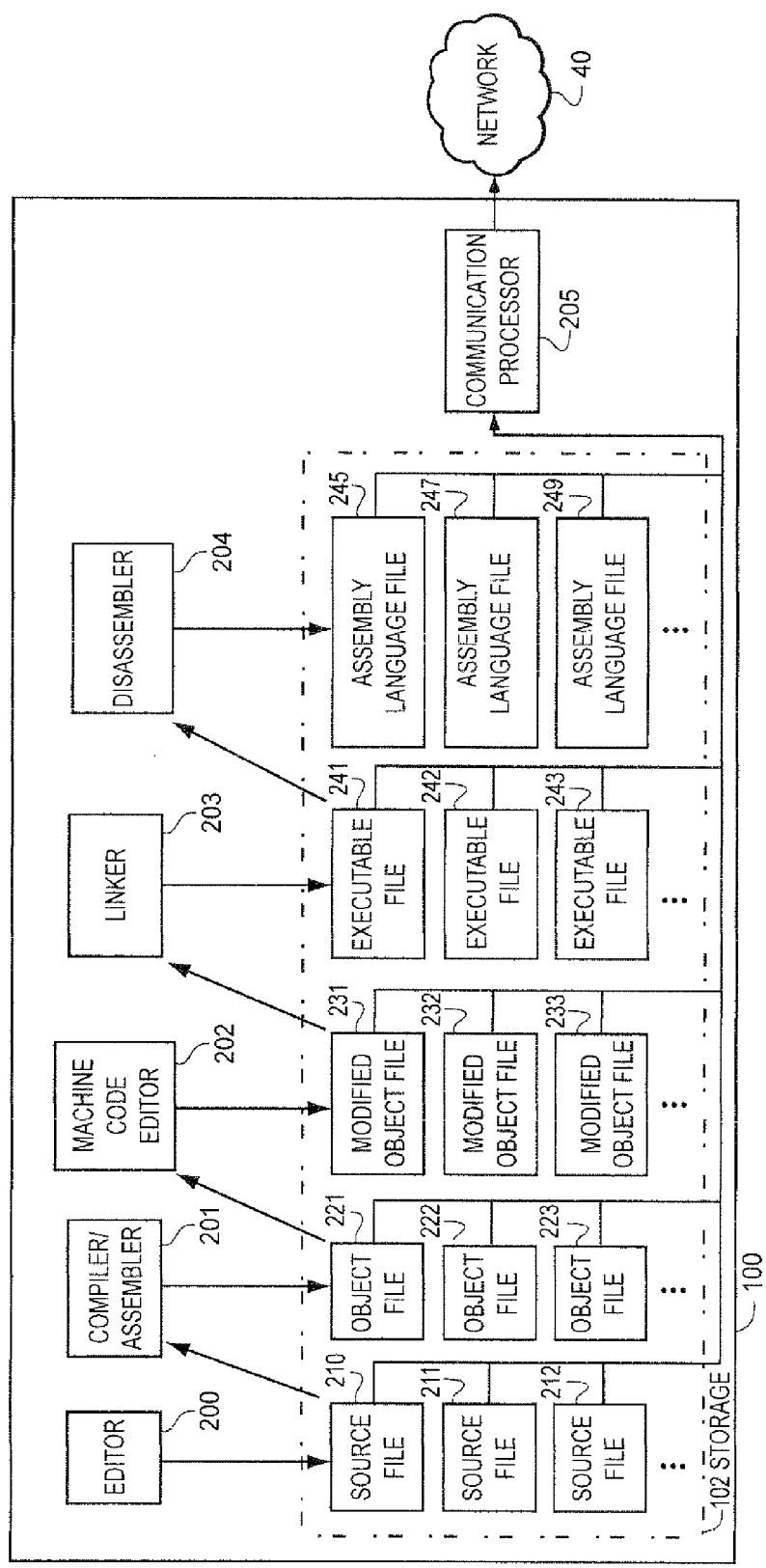
FIG. 2 schematically shows a non-limiting exemplary embodiment of a computer system according to the invention.

FIG. 2 is a block diagram showing the processing functions performed in the platform 100, including the exemplary embodiment presented herein. More specifically, the platform 100 includes the following operational elements: an editor 200, a plurality of source files 210, 211, 212, etc., a compiler or assembler 201, a plurality of object files 221, 222, 223, etc., a machine code editor 202, a plurality of modified object files 231, 232, 233, etc., a linker 203, a plurality of executable files 241, 242, 243, etc., a disassembler 204, and a communication processor 205.

Source files 210, 211, 212 represent a process in the form of a source code written in a programming language. Object files 221, 222, 223 represent a process in the form of a specific machine code that can be directly executed by the computer 100. Modified object files 231, 232, 233 represent modifications made to the object files 221, 222, 223 by the user as will be described later. Executable files 241, 242, 243 are modified machine code files each created by linking one or more modified object files together into one file. All the above files are stored in the storage 102 and/or RAM 103.

A disassembler 204 can transform executable files 241, 242, 243 into assembly language "source" files 245, 247, 249 that in one implementation include both binary (hex) machine instructions and one-to-one corresponding assembly language "source" instructions including op-code mnemonics, address labels and function call labels.

The user can write and edit source codes using the editor 200. The user, for example, a programmer, types a set of instructions in an appropriate programming language, e.g., C++ language. Then, he/she gives a save command to the editor 200, which writes the resulting source file into the storage 102.

The compiler 201 receives a source file and generates a machine code. It accesses the storage 102 to read the source file written by the programmer, parses each line of source code in the file and translates the source code into machine code that can be understood by the computer 100. This process is known as compilation, and the output of compilation is called object code. The compiler 201 saves compiled object code into the storage 102 as an object file.

Subsequently, according to the exemplary embodiment presented herein, the user, e.g., the programmer, has the option to view the machine code produced by the compiler 201, and possibly even modify it or the corresponding high level source code so that the modified version of the machine code, e.g., modified object files 231, 232, 233 are better presented for future viewing, possible debugging, and/or possible amending. These modification techniques presented herein help the user better understand the machine code, outputted from the compiler, in terms of its flow as well as its complexity and also help the user to understand how optimizing compiler 201 compiles the source code.

The linker 203 accesses the storage 102 and reads the one or more modified object code files created by the user. The linker 203 then combines these modified object code files together into a single load module, while editing some portions so that they are organized in a consistent set of instructions with resolved absolute and relative addresses. This process is known as linking. The linker 203 saves these executable files 241, 242, 243 into the storage 102.

The communication processor 205 is in communication with any of the source files, object files, modified object files, executable files and assembly language files as well as with other computers in the network 40.

As discussed above, machine code is a set of instructions that are executed directly by a computer's central processing unit (CPU). Machine code is generally very difficult for most humans to read and understand. These computer instructions may be regarded as the lowest level representation of a compiled and/or assembly computer program and relate in one-to-one correspondence with what the CPU executes. Every processor family has its own machine code instruction set. These instructions correspond to different commands to the machine.

A machine code instruction set may have all instructions of the same length, or it may have variable-length instructions. Most instructions have one or more fields which specify the basic instruction type (e.g., arithmetic, logical, jump, etc.), as well as the actual operation (e.g., add or compare), addressing mode(s), addressing offsets(s), or the actual value itself.

Figure 3:
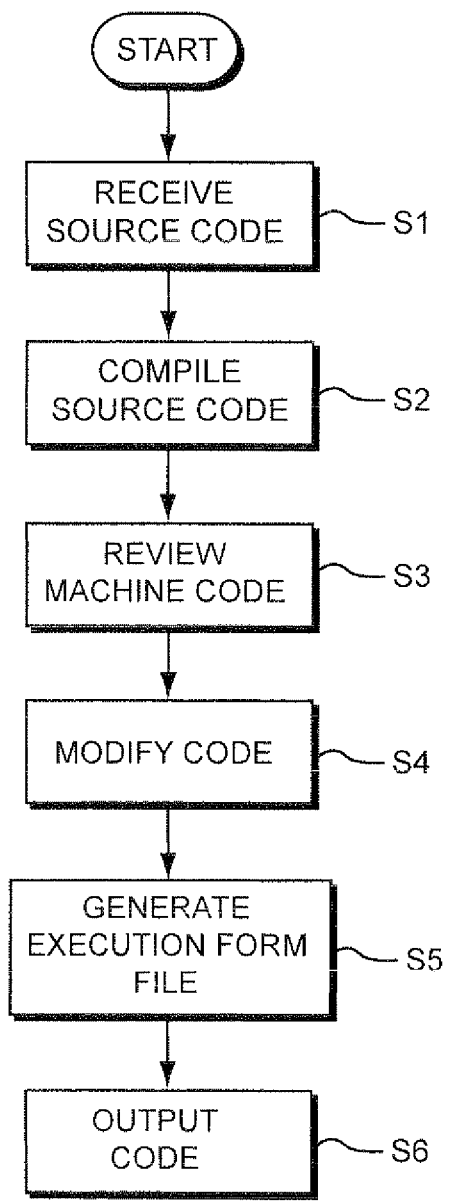
FIG. 3 shows an exemplary illustrative non-limiting software flowchart.

FIG. 3 shows an exemplary illustrative non-limiting software flowchart for a method for modifying machine code to increase its human comprehension according to the exemplary embodiment presented herein. First, in step S1, the computer 100 receives the source code e.g., in C language, written by the user as input. Subsequently, the compiler 201 of the computer 100 compiles the received source code into machine code (alternatively, the compiler 201 may produce intermediate assembly language code, which is then converted by an assembler, not shown, into machine code), step S2. The user receives the machine code (step S3), views, and modifies the program accordingly using one of the techniques described later (step S4). The computer 100 then receives the modified code and generates an executable file via a linker 203 (step S5), which is outputted as output code, step S6.

According to an exemplary embodiment, code review and modification resulting in instruction flow comprehension can be aided in 3 primary ways:

Machine Code Branches Annotated with Arrows

A machine code branching instruction usually only specifies an offset or address to which to branch. Since tracking the branch destination takes extra mental effort, the machine code can be simplified by drawing an arrow from the branch to the destination instruction. Given that some branches are associated to previous machine instructions and some are associated to subsequent machine instructions, the arrows can be organized in an orderly manner.

In one example embodiment, all forward/downward branching arrows appear to the left side of the code and all backward/upward branching arrows appear to the right of the code. When presented in this manner, the arrows have an orderly flow in a counterclockwise fashion, as shown in FIG. 4. For example, as can be seen in FIG. 4, there are four forward/downward branching arrows on the left side of the code and two backward/upward branching arrows appearing on the right side of the code.

Additionally, arrows with identical destinations may be coalesced in their vertical travel as to reduce clutter and arrows. For example, these arrows may be drawn so that they have a common vertical section.

In order to keep the presentation of the code in an orderly manner, branches with closer destinations should lie closer to the code than arrows with distant destinations. For example, as can be seen in FIG. 4, the branch with destination "cmplw r9, r5" is longer than the branch with destination "cmplw r8, r4" on the left side of the code, hence the latter branch is drawn closer to the code.

In this example embodiment, branches that return or link to other functions in the code are best represented as a single horizontal arrow or double-ended arrow. For example, branches that link to other functions in the code are represented with a single horizontal double-ended arrow to the right of the instruction, and return branches are represented with a single horizontal right pointing arrow to the right of the instruction (see arrow to the right of the last instruction line of the code in FIG. 4).

Machine Code Branches Annotated with Indenting

Machine code typically contains no indenting (however, higher level languages often do). In other words, all the instruction lines are vertically aligned. This format does not offer visual insight in tracking the flow of the program. Hence, for cosmetic reasons of comprehension, it is desirable to do so based on logical blocks of code. The preferred embodiment is to iterate over all machine instructions sequentially.

Figure 5:
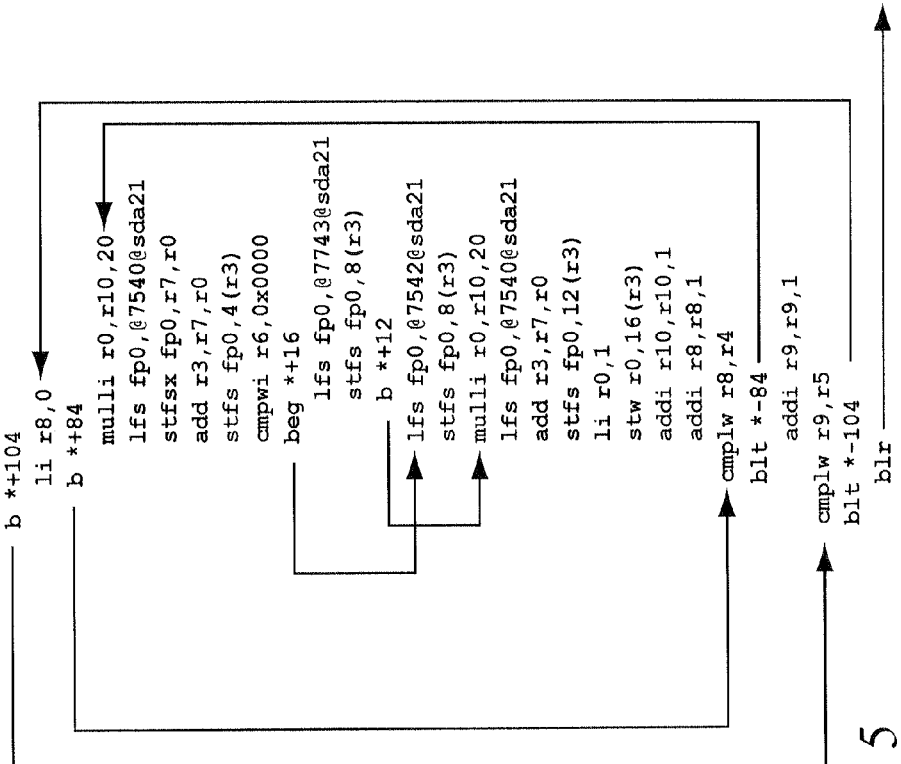
FIG. 5 schematically shows a non-limiting exemplary embodiment of a representation of a machine code block having indented branches.

In one example embodiment, when a downward branch within a function is encountered, then the destination is marked with an indenting freeze symbol (to note that this line should not be further indented). For example, as can be seen in FIG. 5, a downward branch within a function is encountered in the third line, and an indenting freeze symbol such as "*" marks the destination, line 28. Similarly, indenting freeze symbols mark lines 15, 17, 25 corresponding to the destinations of the downward branches.

In this embodiment, when an upward or downward branch within the function is encountered, all subsequent lines are indented until an indenting freeze symbol is encountered or the end of the function is reached. Then processing resumes to the line following the branch. For example, in the code representation of FIG. 5, a branch is encountered in line 3, therefore the subsequent line 4 is indented, and every line thereafter until an indenting freeze symbol is encountered in line 28. The effect of this indentation is to emphasize the significance of code that follows a branch instruction.

Figure 6:
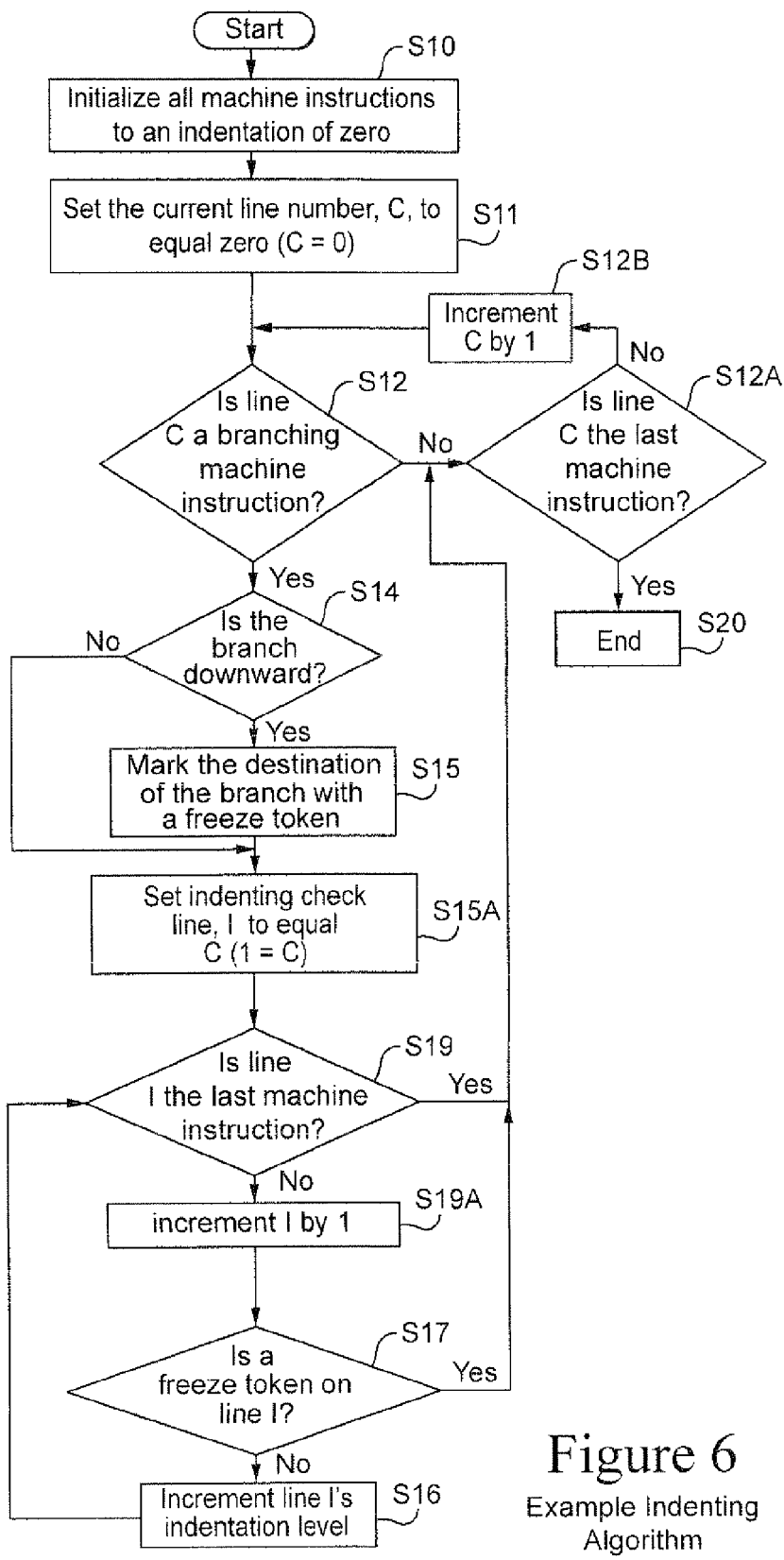
FIG. 6 shows an exemplary illustrative non-limiting software flowchart.

FIG. 6 shows an example indenting algorithm according to which, the indentation level of each machine instruction is incremented by one tab unless they are the destination of a branching instruction.

First, all machine instructions are initialized so that they have an indentation level of zero (step S10). Subsequently, the algorithm walks the list of all machine instructions in the code from start to the end. For example, in the code shown in FIG. 5, the algorithm considers all the machine instructions from the first "li r10,0" to the last "blr". Next, the algorithm determines if a branching machine instruction has been encountered (step S12). If the answer is negative, then the algorithm goes back and continues walking the list of the machine instructions. However, if the answer is affirmative, then the algorithm determines if the branch that was encountered is a downward branch (step S14). If the answer to this determination is negative, the algorithm moves to step S15A (described later). If the answer is positive, then the algorithm marks the destination of the branch with a freeze token in the machine instruction being considered (step S15) and moves to the next step.

In step S15A, after a freeze token is marked in the machine instruction designating the destination of a downward branch, the algorithm walks the subsequent successive machine instructions, incrementing each line's indentation level. After each machine instruction, the algorithm determines if a freeze token is encountered (step S17). If the answer is negative, the algorithm moves to step S16. However, if the answer is affirmative, then the algorithm does not increment that machine instruction line's indentation level, and goes back to step S12 (assuming the current line number is not the last line number, see steps S12A, S12B). Finally, the algorithm determines if a machine instruction is the last in the list of all the machine instructions (step S12A). If it is, the algorithm ends (step S20), otherwise, step S12 is revisited after incrementing the current line number.

An example of an application of the indentation algorithm of FIG. 6 is shown in FIG. 5. The first instruction line where a downward branch is encountered is the third line. Accordingly, a freeze token is used to mark the destination of the branching in that line, and then the next line (line 4) is indented by one tab and every subsequent line is indented until line 28, since line 28 has a freeze token. Subsequent lines 6-12 following line 5 are indented, and the process continues until the last line "blr" is reached (which is a return branch represented with a single horizontal right pointing arrow to the right of the instruction). In another embodiment, only unconditional branches are considered when placing freeze symbols and when indenting. This creates a slightly different/clearer aesthetic.

Machine Code Blocks Annotated with Time Complexity Using the Up Branch Method

In another example embodiment, each line of machine code can be marked with a visual indicator representing an estimation of the time complexity that arises as a result of branching. This is yet another way to visually discern important features as a consequence of branching and program flow. In typical machine code, the programmer cannot quickly read and understand the complexity of a line or a block of lines if multiple loops are provided in the code.

For example, code that does not include any loops is said to have constant running time, typically denoted in big-O notation as $O(1)$. On the other hand, code that includes a single loop is said to have order n time complexity, or $O(n)$, where n is an arbitrary number of times that the loop could be executed. Moreover, if a code loop exists inside another code loop, i.e., if the code has a nested loop, the inner code loop is said to have order $n^2$ time complexity, or $O(n^2)$. In this case, the outer loop could be executed n times and the inner loop could be executed n times for each pass through the outer loop, resulting in the inner loop experiencing a total of n×n iterations. Similarly, a triple loop consisting of a code loop inside a code loop inside a code loop would have order $n^3$ time complexity for the innermost loop, or $O(n^3)$.

Figure 7:
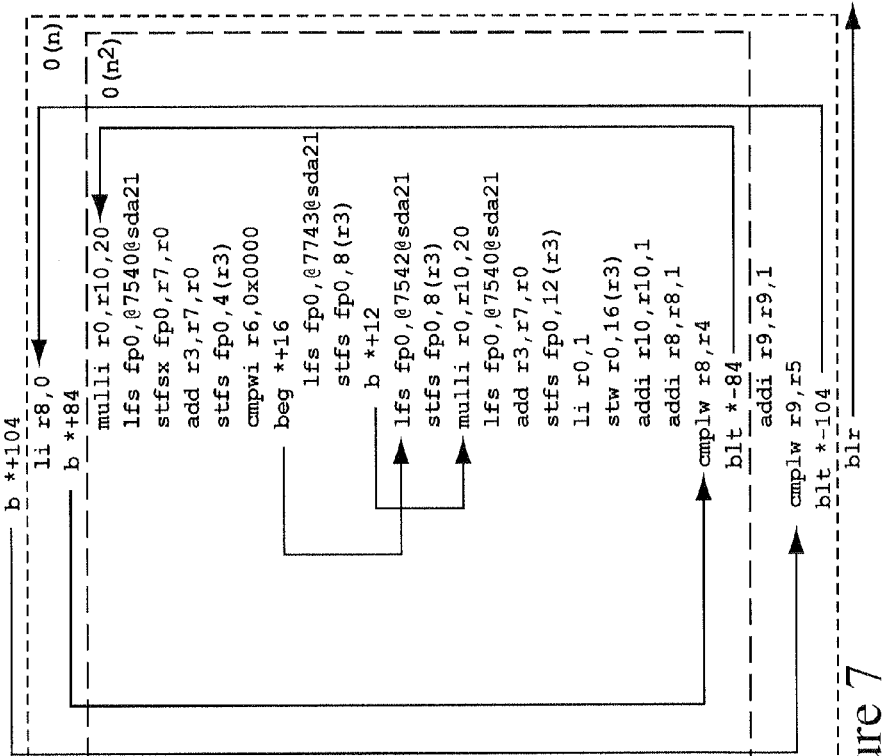
FIG. 7 schematically shows a non-limiting exemplary embodiment of a representation of a machine code block having marks of varying time complexity.

For example, as shown in FIG. 7, the block consisting of the instruction lines between the third line and the next to last line, inclusive, includes a single loop, therefore it is denoted by $O(n)$. On the other hand, the block consisting of the lines between line 5 and line 26, inclusive, includes a loop inside another loop, therefore it is denoted by $O(n^2)$.

Conveying the time complexity of each line of code is helpful in comprehending the structure and flow of the code, so each significant time complexity section could be visually marked with a highlight color or some other visual indication. One example embodiment of this technique is to color code sections with $O(1)$ time complexity as white, code sections with $O(n)$ time complexity as yellow, code sections with $O(n^2)$ time complexity as orange, etc., as shown in FIG. 7 (the different colors are represented in shading because patents generally do not print in color). Another embodiment would be to color code worsening time complexity with monotone gradations of a particular color.

For example, as shown in FIG. 7, the complexity section of level $O(n)$ is depicted with e.g. yellow color (light shading), and the complexity section of level $O(n^2)$ is depicted with e.g. orange color (medium shading).

In addition to designating time complexity of entire blocks of machine code instructions, an example embodiment designates the time complexity of an individual machine code instruction.

In machine code, a loop can be determined by a machine code instruction that conditionally or unconditionally branches to a previous machine code instruction. This loop is the set of all machine code instructions represented between the destination of the machine code branch and the machine code branch itself. The time complexity of a given machine code instruction can be determined by the maximum number of loops the machine code instruction exists within, with the requirement that for a loop to exist within another loop, it must by fully contained. If a machine code instruction exists within no loops, it has $O(1)$ time complexity. If a machine code instruction exists within only one loop, it has $O(n)$ time complexity. If a machine code instruction exists within two loops (a loop within a loop), it has $O(n^2)$ time complexity. If a machine code instruction exists within three loops (a loop within a loop within a loop), it has $O(n^3)$ time complexity. This definition of machine code instruction time complexity continues indefinitely following the given pattern.

The example non-limiting up-branch method presented herein provides a heuristic technique for estimating time complexity based on the inline order in which code was written. Human programmers often write code in an order that reflects nesting. For example, if a portion of code includes an entry point followed by a number of in-order instructions followed by a loop back to the entry point, one can infer that the human programmer intended the in-order instructions to be part of the loop. This assumption does not always hold true; there may be instructions or code fragments within the code block that are accessed remotely from other parts of the code or perhaps never assessed, so they are not part of the loop. Nevertheless, when a programmer writes code defining instructions within a loop, those instructions are likely to be executed as many times as the loop is executed, thus inherently belonging to the loop. The up-branch method thus provides a heuristic analysis that can be useful to infer instructions that belong to a loop based on the order the programmer has written the instructions. Furthermore, in many cases, the accuracy of the up-branch method can be checked by running a different heuristic technique against the same code to detect situations where the up-branch method does not provide an accurate time-complexity indication.

Figure 8:
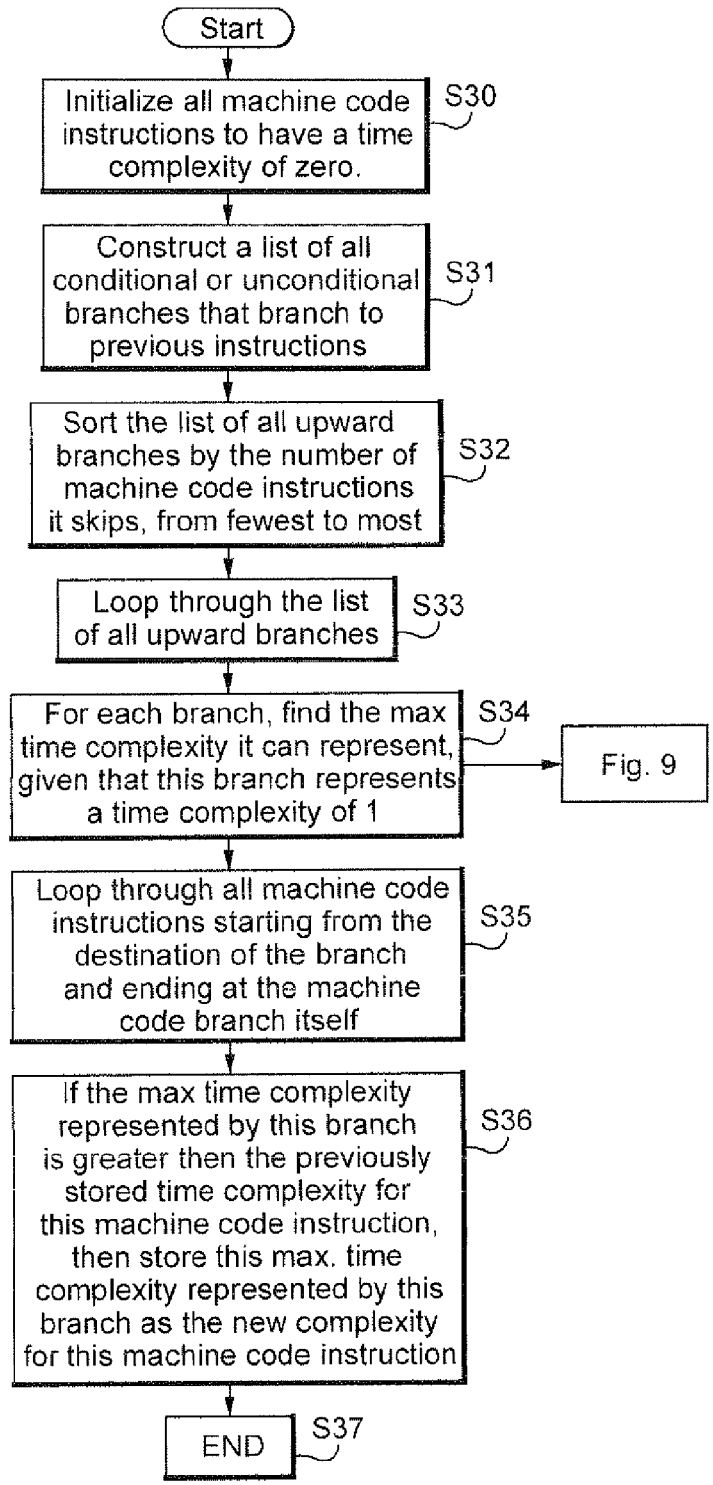
FIG. 8 shows an exemplary illustrative non-limiting software flowchart.

FIG. 8 shows an example non-limiting algorithm according to which the time complexity of a given machine code instruction within a function is determined (called up branch method). In the following, the various complexity levels are denoted as zero=$O(1)$, 1=$O(n)$, 2=$O(n^2)$, 3=$O(n^3)$, etc.

First, in step S30, the algorithm initializes all machine code instructions to have a time complexity of zero. Next, a list is constructed of all conditional or unconditional branches that branch to previous instructions (step S31), followed by sorting the list of all upward branches by the number of machine code instructions it skips, from fewest to most (step S32). The algorithm then loops through the list of all upward branches (step S33) and for each branch, finds the maximum time complexity the branch can represent, given that this branch represents a time complexity of 1 (step S34). The maximum time complexity of the branch is determined by the FIG. 9 flowchart. Subsequently, the algorithm loops through all machine code instructions starting from the destination of the branch and ending at the machine code branch itself (step S35) and if the maximum time complexity represented by this branch is greater than the previously stored time complexity for this machine code instruction, then stores the maximum time complexity represented by this branch as the new time complexity for this machine code instruction (step S36), and reaches the end (step S37).

Figure 9:
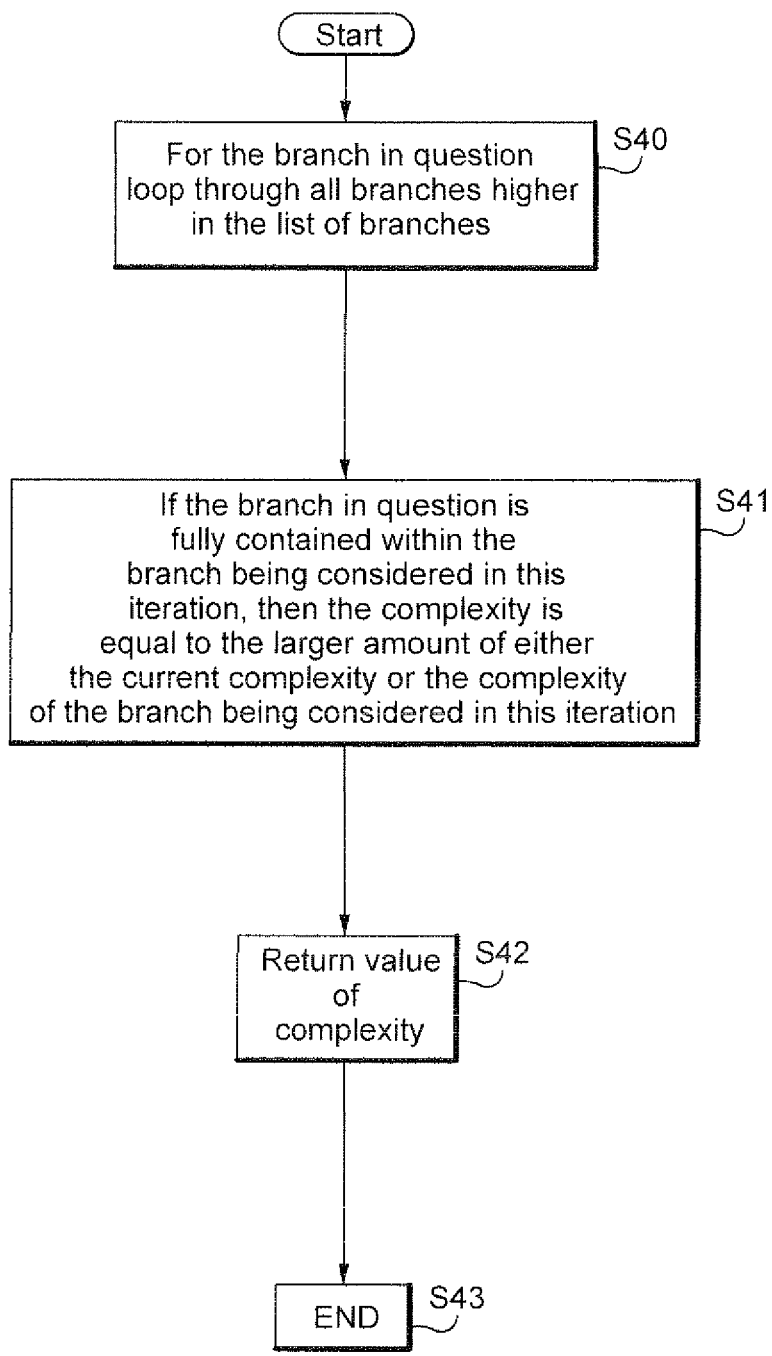
FIG. 9 shows an exemplary illustrative non-limiting software flowchart.

In addition, the following algorithm shown in FIG. 9, can determine the maximum time complexity for a given branch, when given an initial complexity (pseudo code follows at the end of the specification).

For the branch in question, the algorithm loops through all branches that skip more instructions than this branch (step S40), and if the branch in question is fully contained within the branch being considered in this iteration, then the complexity is equal to the larger amount of either the current complexity or the complexity of the branch being considered in this iteration (determined by calling this algorithm recursively with the current complexity), step S41. Finally, in step S42, the algorithm returns a value of the complexity and ends (step S43).

Assembly Code Lines Annotated with Time Complexity Using the Strongly Connected Subgraph Method In one exemplary embodiment, the following algorithm (referred to as the Strongly Connected Subgraph Method) detects the worst case general time complexity of instructions in assembly code. The method is based on the code flow and the destination of branching instructions. Time complexity in terms of $O(n^p)$ can be detected.

Figure 10:
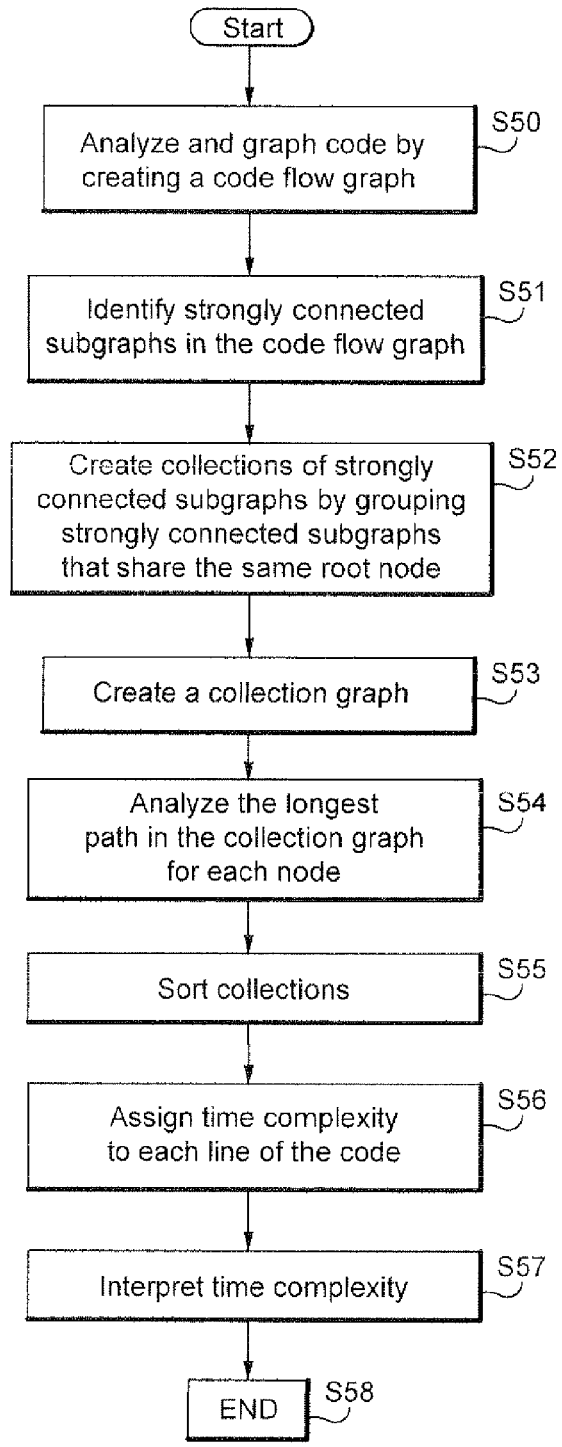
FIG. 10 shows an exemplary illustrative non-limiting software flowchart.

FIG. 10 shows an example non-limiting algorithm according to which the time complexity of a given assembly code instruction is determined.

Create a Code Flow Graph

First, in step S50, a code flow graph is created. More specifically, a directed graph is created where each line of assembly code is a node and the nodes are connected according to the control flow of the program. For example, in a three line assembly program, the code flow normally travels from one line to the next, so the corresponding code flow graph would be {1→2, 2→3, 3→null}. If the first code instruction is a conditional jump to line 3, then the new graph would be {1→2, 1→3, 2→3, 3→null}.

Identify Strongly Connected Subgraphs

Next, in step S51, the algorithm identifies strongly connected subgraphs. A depth-first search from the starting node is conducted to identify all strongly connected subgraphs of the code flow graph. A strongly connected subgraph is any node or group of nodes that form a cycle. More precisely, nodes A and B form a strongly connected subgraph if there exists a path from A to B and there exists a path from B to A (i.e., a cycle is formed). A strongly connected subgraph is identified during the depth-first search when the next node in the search is a node that is already contained in the current traversal. When this occurs, the strongly connected subgraph is recorded, starting with the node that was found to be contained in the current traversal (called the root node) through the last node in the current search traversal. For example, if the depth-first search explores the path {1,2,3,4,5,2}, then the strongly connected subgraph {2,3,4,5} is recorded and the depth-first search continues as if the last node in the previous traversal was a leaf (a termination node without children). In the case where two or more strongly connected subgraphs are identical, only one of those identical strongly connected subgraphs is kept.

Create Collections of Strongly Connected Subgraphs

After strongly connected subgraphs have been identified, they are placed in various collections that share the same root node in step S52. For example, the strongly connected subgraphs {2,3,4} and {2,3,5} would be in the same collection since they both have the same root node of 2.

Before a strongly connected subgraph is to be added to a collection, it is checked whether the strongly connected subgraph is a subset of another strongly connected subgraph within the collection. A graph that is a subset of another graph is defined as a graph that is identical to a contiguous portion of another graph. For example, the graph {2,3,4} is a subset of the graph {2,3,4,5}. If the strongly connected subgraph is a subset of another strongly connected subgraph within the collection, then it is not added to this collection, but rather it is added to another appropriate collection based on having the same root node and not being a subset of any strongly connected subgraph within that collection. If a strongly connected subgraph cannot be added to any collection, then that particular strongly connected subgraph defines its own collection.

Create a Collection Graph

After the various collections of strongly connected subgraphs have been created, a new collection graph of the collections is constructed in step S53 using the following algorithm.

If a collection, C1, has a root node that is contained within another strongly connected subgraph within a different collection, C2, and no strongly connected subgraph in C2 is a subset of a strongly connected subgraph in C1 (even when considering shifting the sequence of nodes), then C1 is defined as a child of C2, e.g., C2→C1. For example, if the collection C1 contains {3,4,5} and the collection C2 contains {2,3,4}, then C1 is a child of C2. As a further example, if the collection C3 contains {2,3} and the collection C4 contains {3,2,4}, then C3 is a child of C4, but C4 is not a child of C3 (because C3 is a subset of C4). Once the graph is complete, for each set of nodes C1 and C2 where C1 is a child of C2 and C2 is a child of C1, these nodes then are disconnected from each other.

Analyze for Longest Path of Each Node in Collection Graph

Next, in step S54, the longest path in the collection graph is analyzed. Using this newly created collection graph of the collections, the longest number of backward node traversals for each node to get to any node with no parents is found. For example, if C1→C2, C1→C3, and C2→C3, then C1 is the only node with no parents and has a traversal cost of zero, C2 has a traversal cost of 1 (one node traversal to get to C1), and C3 has a traversal cost of 2 (two node traversals to get to C1 via C2).

Sort Collections

Following the identification of node traversals in step S54, a sorted list L of collections from lowest to highest is created in step S55, using the number of node traversals as the criterion.

Assign Time Complexity

Next, in step S56, the time complexity (e.g., a natural number, 0, 1, 2, ... p) is assigned to each node (i.e., each line of the code). First, for each line of code, the time complexity is initialized to zero. Then, for each collection in the sorted list L, the time complexity of each individual line of the code (within each strongly connected subgraph of this collection) is assigned as the value of node traversals plus one.

Interpret Time Complexity

Finally, in step S57, depending on the time complexity assigned to each line, the complexity of the line is denoted in big-O notation as follows:

$$0 \to O(n^0) = O(1)$$
$$1 \to O(n^1) = O(n)$$
$$2 \to O(n^2)$$
$$3 \to O(n^3)$$
$$4 \to O(n^4)$$
$$...$$
$$p \to O(n^p) \text{ and}$$

the program ends (step S58).

Examples

The strongly connected subgraph method described above can be used for example to detect time complexity for the following example assembly code programs.

Example Assembly Program #1

```
1: Do work
2: Do work
3: Do work
4: Conditionally branch to line 3
5: Conditionally branch to line 7
6: Do work
7: Conditionally branch to line 2
8: Do work
```

-continued

Step 1: Create a code flow graph

```
1 → 2
2 → 3
3 → 4
4 → 3, 4 → 5
5 → 6, 5 → 7
6 → 7
7 → 2, 7 → 8
8 → null
```
Step 2: Identify strongly connected subgraphs

```
1
1,2
1,2,3
1,2,3,4
1,2,3,4, (3)              Found strongly connected subgraph: 3,4
1,2,3,4,5
1,2,3,4,5,7
1,2,3,4,5,7, (2)          Found strongly connected subgraph: 2,3,4,5,7
1,2,3,4,5,7,8
1,2,3,4,5,6
1,2,3,4,5,6,7
1,2,3,4,5,6,7 (2)         Found strongly connected subgraph: 2,3,4,5,6,7
1,2,3,4,5,6,7,8
List of all strongly connected subgraphs:
2,3,4,5,6,7
2,3,4,5,7
3,4
```
Step 3: Create collections of strongly connected subgraphs Collection A:
    3,4
Collection B:
    2,3,4,5,6,7
    2,3,4,5,7
Step 4: Create a collection graph B → A
Step 5: Analyze the longest path in collection graph Collection A: 1
Collection B: 0
Step 6: Sort collections Collection B: 0
Collection A: 1
Step 7: Assign time complexity 1: 0
2: 1
3: 2
4: 2
5: 1
6: 1
7: 1
8: 0
Step 8: Interpret time complexity 1: $O(1)$
2: $O(n)$
3: $O(n^2)$
4: $O(n^2)$
5: $O(n)$
6: $O(n)$
7: $O(n)$
8: $O(1)$ Example Assembly Program #2

1: Do work
2: Conditionally branch to line 1
3: Conditionally branch to line 1
4: Do work -continued Step 1: Create a code flow graph

```
1 → 2
2 → 3, 2 → 1
3 → 4, 3 → 1
4 → null
```
Step 2: Identify strongly connected subgraphs

```
1
1,2
1,2, (1)              Found strongly connected subgraph: 1,2
1,2,3
1,2,3, (1)            Found strongly connected subgraph: 1,2,3
1,2,3,4
List of all strongly connected subgraphs:
1,2
1,2,3
```
Step 3: Create collections of strongly connected subgraphs Step 3a: Collection A:
    1,2
    1,2,3
Step 3b: Collection A:
    1,2,3
    Collection B:
        1,2           (was a subset of {1,2,3} in collection A)
Step 4: Create a collection graph A → B
Step 5: Analyze the longest path in collection graph Collection A: 0
Collection B: 1
Step 6: Sort collections Collection A: 0
Collection B: 1
Step 7: Assign time complexity 1: 2
2: 2
3: 1
4: 0
Step 8: Interpret time complexity 1: $O(n^2)$
2: $O(n^2)$
3: $O(n)$
4: $O(1)$ Example Assembly Program #3

1: Conditionally branch to line 3
2: Conditionally branch to line 4
3: Conditionally branch to line 2
4: Conditionally branch to line 3
Step 1: Create a code flow graph

```
1 → 2, 1 → 3
2 → 3, 2 → 4
3 → 4, 3 → 2
4 → 3, 4 → null
```
Step 2: Identify strongly connected subgraphs

```
1
1,3
1,3,2
1,3,2,4
1,3,2,4, (3)          Found strongly connected subgraph: 3,2,4
1,3,2, (3)            Found strongly connected subgraph: 3,2
1,3,4
1,3,4, (3)            Found strongly connected subgraph: 3,4
1,2
1,2,4
1,2,4,3
1,2,4,3, (2)          Found strongly connected subgraph: 2,4,3
```

-continued

```
1,2,4,3, (4)         Found strongly connected subgraph: 4,3
1,2,3
1,2,3, (2)           Found strongly connected subgraph: 2,3
1,2,3,4
1,2,3,4, (3)         Found strongly connected subgraph: 3,4
List of all strongly connected subgraphs (eliminating any
duplicates):
3,2,4
3,2
3,4
2,4,3
4,3
2,3
Step 3: Create collections of strongly connected subgraphs Step 3a:
    Collection A:
    2,3
    2,4,3
Collection B:
    3,2
    3,2,4
    3,4
Collection C:
    4,3
Step 3b:
    Collection A:
    2,4,3
    2,3
Collection B:
    3,2,4
    3,4
Collection C:
    4,3
Collection D:
    3,2          (was a subset of {3,2,4} in collection B)
Step 4: Create a collection graph Step 4a:
A → B
B → C
A → D
B → A
B → C
B → D
C → D
Step 4c:
A → B, B → A     Break both connections between A and B
A → C
A → D
B → C
B → D
C → D
Step 5: Analyze the longest path in collection graph Collection A: 0
Collection B: 0
Collection C: 1
Collection D: 2
Step 6: Sort collections Collection A: 0
Collection B: 0
Collection C: 1
Collection D: 2
Step 7: Assign time complexity 1: 0
2: 3
3: 3
4: 2
Step 8: Interpret time complexity 1: O(1)
2: O(n³)
3: O(n³)
4: O(n²)
```

Combining Time Complexity Detection Algorithms

Two methods for computing time complexity have been disclosed in the present application; the up branch method and the strongly connected subgraph method. A listing of the strengths and weaknesses of each as well as the differences between them includes:

The up branch method will sometimes incorrectly attribute a higher time complexity to a line of code due to the grouping nature of the algorithm with respect to line numbering, when in fact the code line might not be a true part of the cycle (see Example assembly program #4).

The up branch method is conservative, not recognizing cycle containment when the first or last lines of the code are shared between cycles, and not recognizing cycle containment when a cycle partially overlaps another cycle with regard to line numbering (see Example assembly program #5).

The strongly connected subgraph method will aggressively recognize cycle containment, when in fact the source code or assembly code might not result in this time complexity, since the actual computation of each line of code that causes a branch to be taken is not analyzed. This also results in less time complexity precision; complexities of O(log n) etc., cannot be derived.

The strongly connected subgraph method will never attribute a lower time complexity to a line of code than it is theoretically possible, thus every computed time complexity is a maximum.

Given the above strengths and weaknesses of the up branch method time complexity algorithm and the strongly connected subgraph method time complexity algorithm, the following strategies are advantageous:

Use the strongly connected subgraph method to determine the worst case time complexity that is theoretically possible.

Take the minimum time complexity for each line of code between the up branch method and the strongly connected subgraph method (see Example assembly program #4 and #5). This will give a conservative estimate of time complexity while eliminating any incorrect higher time complexities present in the up branch method.

More Examples

The above disclosed two methods for computing time complexity were used and the results were compared for the following two example assembly programs:

Example Assembly Program #4

```
1: Conditionally branch to line 3
2: Unconditionally branch to line 4 (this code line is not in a cycle)
3: Conditionally branch to line 1
4: Do work
Up Branch Method of computing time complexity:
1: O(n)
2: O(n)
3: O(n)
4: O(1)
Strongly Connected Subgraph Method of computing time
complexity:
1: O(n)
2: O(1)
3: O(n)
4: O(1)
Minimum between each time complexity method (conservative with
no errors)
1: Min ((O(n), O(n)) = O(n)
2: Min ((O(1), O(n)) = O(1)
```

```
3: Min ((O(n), O(n)) = O(n)
4: Min ((O(1), O(1)) = O(1)
```

Example Assembly Program #5

```
1: Conditionally branch to line 3
2: Unconditionally branch to line 5 (this code line is not in a cycle)
3: Conditionally branch to line 1
4: Conditionally branch to line 1
5: Do work
Up Branch Method of computing time complexity:
1: O(n)
2: O(n)
3: O(n)
4: O(n)
5: O(1)
Strongly Connected Subgraph Method of computing time
complexity:
1: O(n²)
2: O(1)
3: O(n²)
4: O(n)
5: O(1)
Minimum between each time complexity method (conservative with
no errors)
1: Min ((O(n), O(n²)) = O(n)
2: Min ((O(1), O(n)) = O(1)
3: Min ((O(n), O(n²)) = O(n)
4: Min ((O(n), O(n)) = O(n)
4: Min ((O(1), O(1)) = O(1)
```

Figure 11:
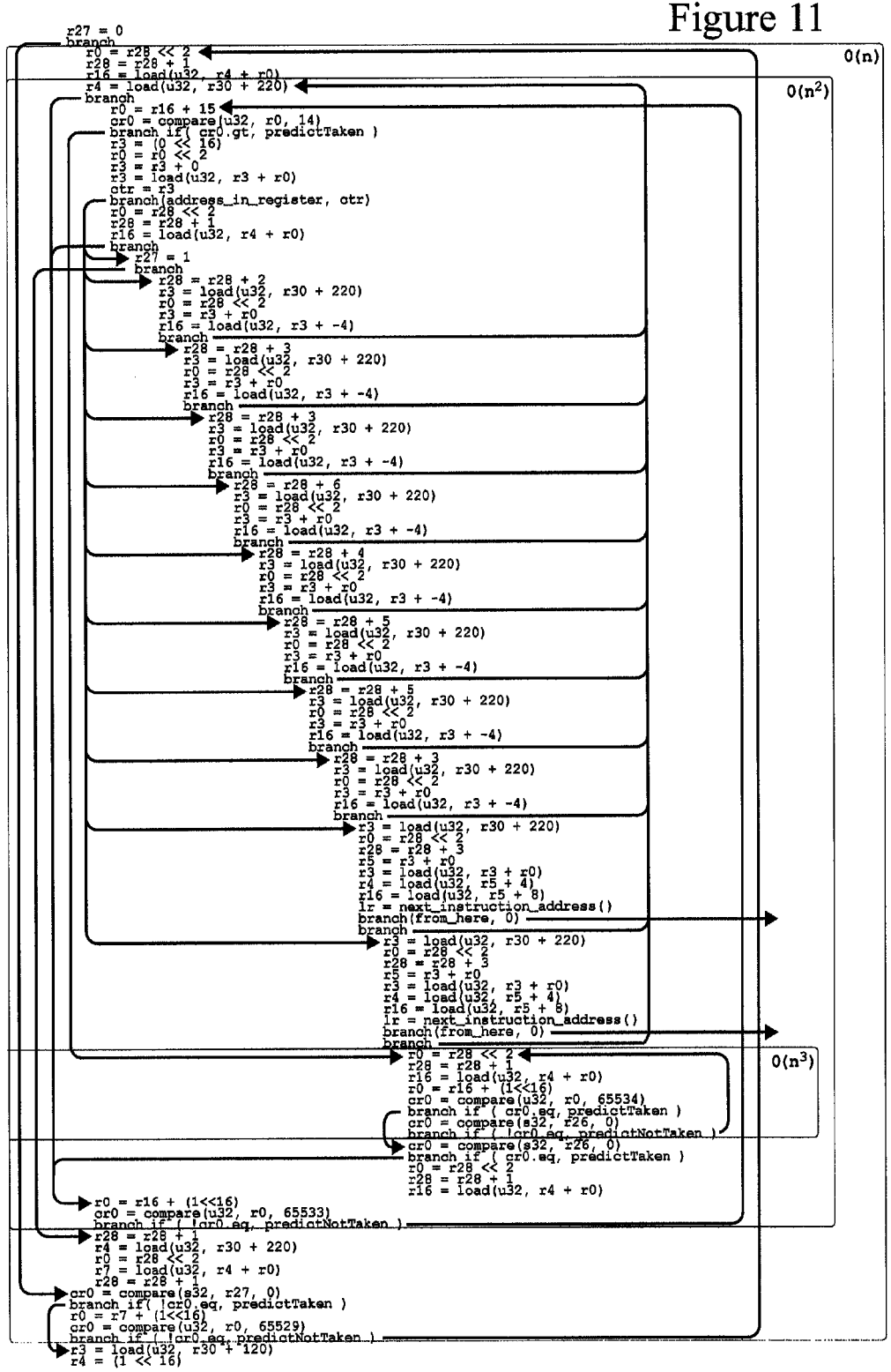
FIG. 11 shows an example of a code sequence and the time complexity of the code sequence derived using the up branch method.
Figure 12:
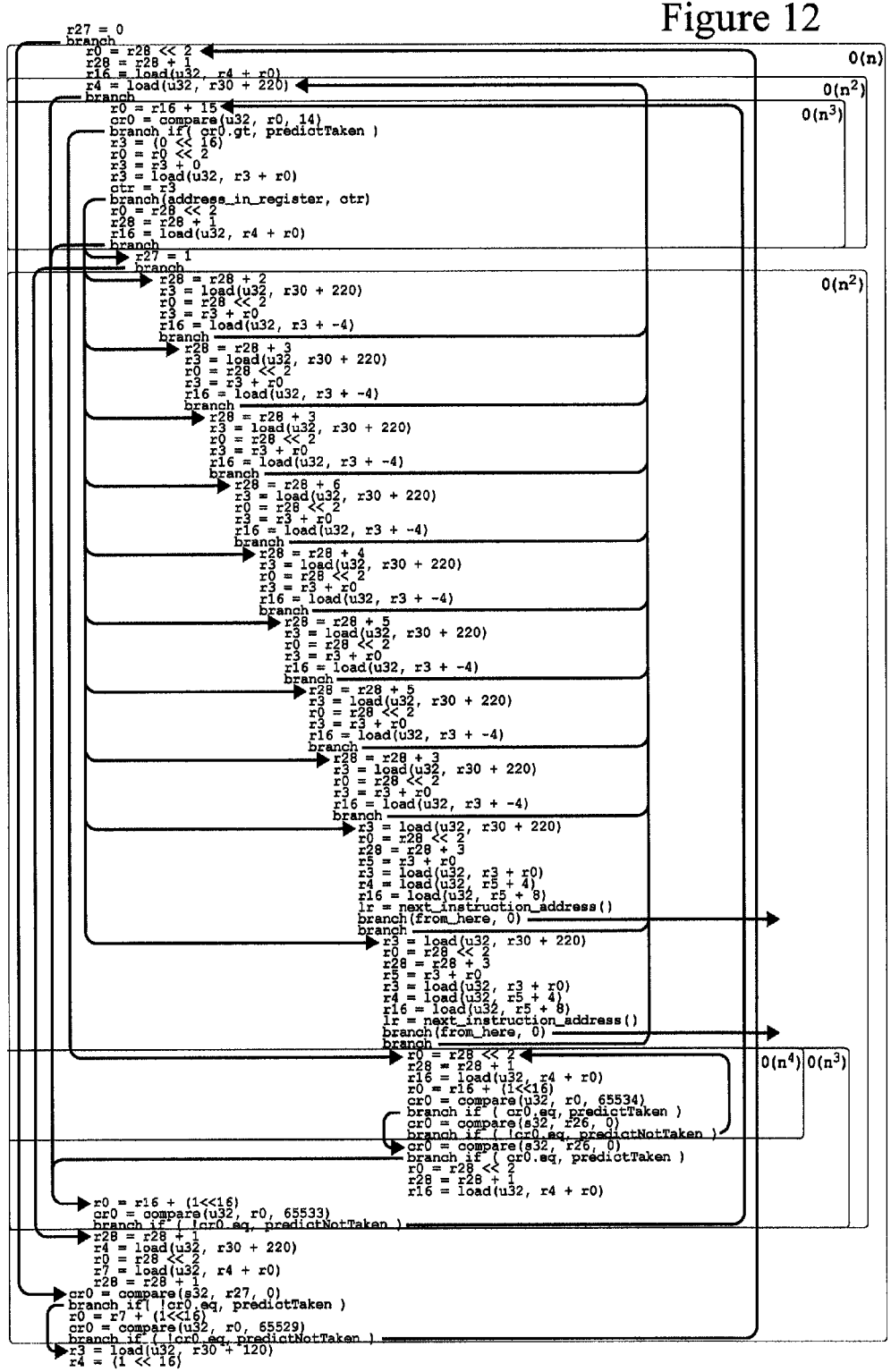
FIG. 12 shows the code sequence of FIG. 11 and the time complexity of the code sequence derived using the strongly connected subgraph method.
Figure 13:
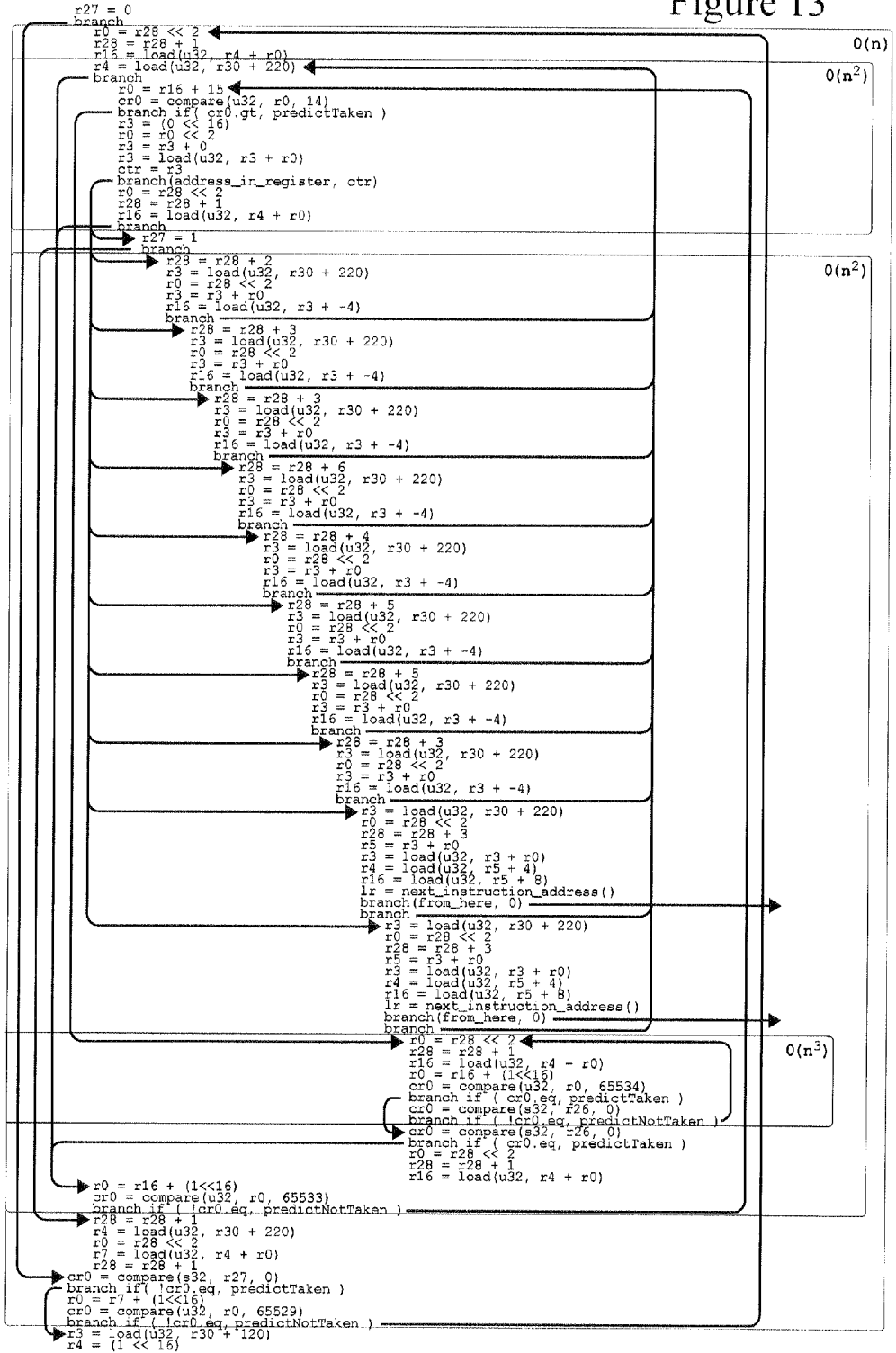
FIG. 13 shows the code sequence of FIG. 11 and the time complexity of the code sequence derived by using a combination of the up branch method and the strongly connected subgraph method.

FIG. 11 and FIG. 12 show an example of a complex code sequence with corresponding time complexity analysis results using the up branch method and the strongly connected subgraph method, respectively. More specifically, FIG. 11 shows an example of a code sequence and the time complexity of the code sequence derived using the up branch method. FIG. 12 shows the exact same code sequence and the time complexity results derived using the strongly connected subgraph method. As can be seen from FIG. 11 and FIG. 12, the two methods produce different values for the time complexity measure for some code lines due to their different nature and approach of detecting cycles, etc. Therefore, as mentioned above, the two methods may be combined by taking the minimum time complexity measure for each line of code between the up branch method and the strongly connected subgraph method. This is shown in FIG. 13. This represents a conservative estimate of the time complexity, which eliminates any incorrect higher time complexities inherently resulting from the up branch method.

The following provides an additional description of exemplary illustrative non-limiting algorithm implementations:

Graphical arrows extending from a branching machine instruction line to the destination machine instruction line, such that
  a. downward branches appear on the left side of the machine code and consist of:
    i. A horizontal line at the source line of the branch, connecting to:
    ii. A vertical line traveling from the horizontal line down to the destination instruction line, connecting to:
    iii. A horizontal line at the destination of the branch with a rightward arrow pointing at the destination instruction.
  b. upward branches appear on the right side of the machine code and consist of:
    i. A horizontal line at the source line of the branch, connecting to:
    ii. A vertical line traveling from the horizontal line up to the destination instruction line, connecting to:
    iii. A horizontal line at the destination of the branch with a leftward arrow pointing at the destination instruction.
  c. the combination of downward and upward branches gives an impression of a counterclockwise flow when there are interleaved machine instructions that branch downward and upward in relative proximity of each other.
  d. the branches that share a common destination are optionally drawn with their vertical lines on top of each other.
  e. the branches that don't share a common destination are drawn with their vertical lines not on top of each other.
  f. branches with closer destinations should have their vertical lines lie closer to the code than branches with further destinations.
  g. branches that link to other functions are represented with a single horizontal double-ended arrow to the right of the instruction.
  h. return branches are represented with a single horizontal right pointing arrow to the right of the instruction.

Machine instructions that follow branching machine instructions are indented by one tab unless they are the destination of a branching instruction, according to the following algorithm:
  a. Initialize all machine instructions to have an indentation level of zero.
  b. Walk the list of machine instructions from start to end.
  c. If a branching machine instruction is encountered, do the following:
    i. If the branch is downward, mark the destination with a freeze token
    ii. Walk the successive machine instructions, incrementing each line's indentation level.
    iii. If a freeze token is encountered, do not increment that line's indentation level and abort step c and continue with step b.

Computational time complexity is an important property of code and can be visualized by visually indicating blocks of code by their corresponding time complexity. Time complexity for all machine code instructions within a function can be determined with the following up-branch algorithm, with zero=O(1), 1=O(n), 2=O(n²), 3=O(n³), etc:
  a. Initialize all machine code instructions to have a time complexity of zero.
  b. Construct a list of all conditional or unconditional branches that branch to previous instructions.
  c. Sort the previous list of all branches by the number of machine code instructions it skips, from fewest to most.
  d. Loop through the previous list of all branches
    i. For this branch, find the maximum time complexity it can represent, given that this branch represents a time complexity of 1.
    ii. Loop through all machine code instructions starting from the destination of the branch and ending at the machine code branch itself.
      a. If the maximum time complexity represented by this branch is larger than the previously stored time complexity for this machine code instruction, then store the maximum time complexity represented by this branch as the new time complexity for this machine code instruction.

The following algorithm can determine the maximum time complexity for a given branch, when given an initial complexity (pseudocode follows the description):

a. Given a list of all conditional or unconditional branches that branch to previous instructions, sorted based on the number of machine code instructions it skips, from fewest to most.
b. For the branch in question, loop through all branches that skip more instructions than this branch.
  i. If the branch in question is fully contained within the branch being considered in this iteration, then:
    a. The complexity is equal to the larger amount of either the current complexity or the complexity of the branch being considered in this iteration (determined by calling this algorithm recursively with the current complexity).
c. Return complexity.

Example source code for up-branch marking time complexity algorithm is shown below:

```
void MarkTimeComplexityMachineCodeInstructions( )
{
   Set all machine code instructions to have a time complexity of zero.
   Create list "L" of all branches that skip to previous instructions.
   Sort list "L" by the number of instructions it skips, from least to most.
   For each branch in list "L"
   {
      time_complexity = FindMaxTimeComplexityRecursive(L, i, 1)
      For each machine code instruction in this branch
      {
         instruction.time_complexity =
            max(instruction.time_complexity, time_complexity)
      }
   }
}
int FindMaxTimeComplexityRecursive(list L, int index, int complexity)
{
   For each branch in L, starting with the branch at index + 1
   {
      If the branch at L[index] is fully contained within this branch
      {
         complexity = max(complexity,
            FindMaxTimeComplexityRecursive( L, i, complexity + 1)
      }
   }
   return complexity
}
```

The above disclosed techniques can be used to transform machine code or an assembly code visually, so that it is easier to be reviewed and understood by a user, for example, a programmer, thus possibly amending it to make it faster. The methods can be used on machine code produced by any kind of compiler; therefore the disclosed methods are not computer specific, and can be used in conjunction with any type of a machine having computation capabilities.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method for detecting a time complexity associated with an executable program stored in a computer memory device, comprising:
 (1) automatically analyzing said stored program with a computer processor to detect the time complexity of said program based on loops in the code;
 (2) automatically analyzing said stored program with said processor to detect the time complexity of said program based on a code flow and a destination of branching instructions in the program;
 automatically determining the minimum time complexity between the time complexity detected in (1) and the time complexity detected in (2) as the time complexity of said program.

2. A non-transitory computer-readable storage medium with an executable machine code program stored thereon, wherein the program instructs a microprocessor to perform a sequence of steps, the program represented graphically comprises a plurality of machine instruction lines, wherein graphical arrows extend from a branching machine instruction line to a destination machine instruction line, such that
 a. arrows corresponding to downward branches appear on a left side of the machine code and comprise:
  a horizontal line originating at the source line of the branch, said horizontal line connected to a vertical line traveling from the horizontal line down to the destination instruction line, said vertical line connected to a horizontal line at the destination of the branch with a rightward arrow pointing at the destination instruction;
 b. arrows corresponding to upward branches appear on a right side of the machine code and comprise:
  a horizontal line originating at the source line of the branch, said horizontal line connected to a vertical line traveling from the horizontal line up to the destination instruction line, said vertical line connected to a horizontal line at the destination of the branch with a leftward arrow pointing at the destination instruction.

3. The non-transitory computer-readable storage medium according to claim 2, wherein
 the combination of downward and upward branches has a counterclockwise flow when there are interleaved machine instructions that branch downward and upward in relative proximity of each other.

4. The non-transitory computer-readable storage medium according to claim 2, wherein
 branches that share a common destination are drawn with their vertical lines on top of each other, and branches that do not share a common destination are drawn with their vertical lines not on top of each other.

5. The non-transitory computer-readable storage medium according to claim 2, wherein
 branches with closer destinations have their vertical lines lie closer to the code than branches with further destinations.

6. The non-transitory computer-readable storage medium according to claim 2, wherein
 branches that link to other functions in the code are represented with a single horizontal double-ended arrow to the right of the instruction.

7. The non-transitory computer-readable storage medium according to claim 2, wherein
 return branches are represented with a single horizontal right pointing arrow to the right of the instruction.

8. A non-transitory computer-readable storage medium with an executable machine code program stored thereon, wherein the program instructs a microprocessor to perform a sequence of steps, the program represented graphically comprises a plurality of machine instruction lines, wherein
 a machine instruction that immediately follows a branching machine instruction is indented by one tab, unless it is the destination of a branching instruction.

9. The non-transitory computer-readable storage medium according to claim 8, wherein
when a downward branch within a function is encountered, the destination is marked with an indenting freeze symbol.

10. The non-transitory computer-readable storage medium according to claim 8, wherein
when an upward or downward branch within a function is encountered, all subsequent lines are indented until an indenting freeze symbol is encountered or the end of the function is reached.

11. A non-transitory computer-readable storage medium with an executable machine code program stored thereon, wherein the program instructs a microprocessor to perform a sequence of steps, the program represented graphically comprises a plurality of machine instruction lines, wherein
blocks of code are visually marked according to their corresponding time complexity, said time complexity including the number of loops in the code the blocks are associated with during the program flow.

12. The non-transitory computer-readable storage medium according to claim 11, wherein
a block that has j loops, where j is an integer greater or equal to 0, is said to have order n time complexity, and is visually marked by a $O(n^j)$ notation, where n is an arbitrary number of times that a loop is executed.

13. The non-transitory computer-readable storage medium according to claim 11, wherein
each complexity section of the code is additionally visually marked with a visual indication.

14. The non-transitory computer-readable storage medium according to claim 13, wherein
said visual indication comprises a gradation of a highlight color.

15. The non-transitory computer-readable storage medium according to claim 11, wherein
the time complexity of a given machine instruction line is visually marked, said time complexity denoting the maximum number of consecutive loops the machine instruction line exists within.

16. A method for detecting a time complexity associated with each instruction line of an executable machine code program, each instruction line visually marked according to its corresponding time complexity, said method comprising:
creating a code flow graph, wherein nodes corresponding to individual lines of the code program are connected based on a control flow of the program;
identifying strongly connected subgraphs corresponding to any group of nodes within the code flow graph that form a cycle;
grouping said strongly connected subgraphs into collections so that each strongly connected subgraph of a collection shares the same root node;
creating a collection graph by constructing a directed graph of said collections based on whether a root node contained in one collection among said collections is contained within another collection;
analyzing for longest path in said collection graph by finding a longest number of backward node traversals for each node of each said collection to get to any node that has no parents without repeating nodes;
sorting collections by creating a sorted list of collections from lowest to highest using the number of node traversals in said analyzing for longest path;
assigning time complexity value p, wherein p=0, 1, 2, . . . , to each instruction line of code based on a value of node traversals;
assigning a time complexity measure $O(n^p)$ for each line of the machine code program.

17. An apparatus for formatting computer machine code to enhance comprehension of an underlying flow of the program by a user, comprising:
an editor that receives source code inputted by a user and generates a corresponding source file;
a compiler that receives the source file and generates an object file comprising machine code;
a machine code editor that receives the object file and changes the state of the object file to produce a modified object file, so that the program represented graphically comprises a plurality of machine instruction lines, wherein
graphical arrows extend from a branching machine instruction line to a destination machine instruction line, wherein
a machine instruction that immediately follows a branching machine instruction is indented by one tab, unless it is the destination of a branching instruction, and wherein
blocks of code are visually marked according to their corresponding time complexity, said time complexity including the number of loops in the code the blocks are associated with during the program flow; and
a linker that receives the modified object file and generates an executable file, which is outputted as an output file.

18. A method for formatting computer machine code to enhance comprehension of an underlying flow of the program by a user, comprising:
receiving source code inputted by a user in an editor and generating a corresponding source file;
receiving the source file generated by the editor in a compiler and generating an object file comprising machine code;
receiving the object file generated by the compiler in a machine code editor and changing the state of the object file to produce a modified object file, so that the program represented graphically comprises a plurality of machine instruction lines, wherein
graphical arrows extend from a branching machine instruction line to a destination machine instruction line, wherein
a machine instruction that immediately follows a branching machine instruction is indented by one tab, unless it is the destination of a branching instruction, and wherein
blocks of code are visually marked according to their corresponding time complexity, said time complexity including the number of loops in the code the blocks are associated with during the program flow; and
receiving the modified object file generated by the machine code editor in a linker and generating an executable file, which is outputted as an output file.

19. A computer-operated method of estimating a time complexity of code without needing to dynamically execute the code, the method performed by a computer processor that accesses a non-transitory memory device storing said code, said computer processor performing the following steps:
determining branches in the code;
ascertaining whether a first determined one of said branches is fully contained within another determined one of said branches that skips more instructions than said first branch;
if said ascertaining ascertains that said first branch is fully contained, declaring increased time complexity associated with said first branch; and recursively performing at least some of the above-mentioned steps for further determined ones of said branches in the code to estimate the maximum time complexity of the code.

20. The method according to claim 19, wherein said performing is recursively performed for each determined branch in the code.

21. The method according to claim 19, wherein said branches contain instructions and said performing step assigns a time complexity for each of said instructions by comparing previously assigned time complexity values associated with said instructions with said declared time complexities associated with said branches.

22. The method according to claim 19, wherein said determining comprises determining whether, in an ordered static listing of said code, the determined branches branch to previous portions of the ordered listing.

23. The method of claim 19, wherein said determining determines branches in the code that branch in a predetermined direction.

24. The method according to claim 23, wherein said predetermined direction comprises upwardly.

25. The method according to claim 19, further including displaying said estimated maximum time complexity on a display device to provide a humanly-perceivable indication.

* * * * *